US008122375B2

(12) United States Patent
Ito (10) Patent No.: US 8,122,375 B2
(45) Date of Patent: Feb. 21, 2012

(54) ELECTRONIC DEVICE AND METHOD FOR CONTROLLING ITS MENU DISPLAY

(75) Inventor: Sakae Ito, Niigata (JP)

(73) Assignee: Fuji Xerox Co., Ltd., Tokyo (JP)

( * ) Notice: Subject to any disclaimer, the term of this patent is extended or adjusted under 35 U.S.C. 154(b) by 787 days.

(21) Appl. No.: 11/041,367

(22) Filed: Jan. 25, 2005

(65) Prior Publication Data

US 2006/0064651 A1    Mar. 23, 2006

(30) Foreign Application Priority Data

Sep. 21, 2004    (JP) ................................. 2004-273457

(51) Int. Cl.
*G06F 3/048*    (2006.01)

(52) U.S. Cl. ........ 715/811; 715/810; 715/825; 715/853; 715/854

(58) Field of Classification Search .................. 715/853, 715/854, 713, 855, 810, 811, 812, 814, 825, 715/827; 707/102
See application file for complete search history.

(56) References Cited

U.S. PATENT DOCUMENTS

| 5,396,264 | A  | * | 3/1995  | Falcone et al. ............... | 715/811 |
| 5,497,455 | A  | * | 3/1996  | Suga et al. .................... | 715/835 |
| 5,666,502 | A  | * | 9/1997  | Capps ........................... | 715/811 |
| 7,318,198 | B2 | * | 1/2008  | Sakayori et al. .............. | 715/729 |
| 7,322,012 | B2 | * | 1/2008  | Ishii .............................. | 715/811 |
| 2001/0012980 | A1 | * | 8/2001 | Uchida et al. ................. | 701/208 |
| 2001/0019338 | A1 | * | 9/2001 | Roth ............................. | 345/811 |
| 2001/0030667 | A1 | * | 10/2001 | Kelts ............................ | 345/854 |
| 2003/0169298 | A1 | * | 9/2003 | Ording ......................... | 345/810 |
| 2003/0169300 | A1 | * | 9/2003 | Colgrove ..................... | 345/810 |
| 2004/0080547 | A1 | * | 4/2004 | Goto ............................ | 345/827 |
| 2004/0100505 | A1 | * | 5/2004 | Cazier ......................... | 345/811 |
| 2005/0076309 | A1 | * | 4/2005 | Goldsmith ................... | 715/811 |

FOREIGN PATENT DOCUMENTS

| JP | 63-015323 A | 1/1988 |
| JP | 05-035432 A | 2/1993 |
| JP | 09-104151 A | 4/1997 |
| JP | 09-190261 A | 7/1997 |
| JP | 11-240229 A | 9/1999 |

* cited by examiner

*Primary Examiner* — Steven Sax
*Assistant Examiner* — Grant D Johnson
(74) *Attorney, Agent, or Firm* — Sughrue Mion, PLLC (57) ABSTRACT

An electronic device which displays a function setting menu for managing plural items by a hierarchical structure on a display and sets setting contents of various functions based on the function setting menu displayed on the display, comprising: a display control unit which displays each item in the function setting menu having the hierarchical structure on the display based on the hierarchical structure in accordance with an operation by a user; a function selection unit which selects and displays on the display the content of a desired function based on the items of the function setting menu displayed by the display control unit; and a hierarchical structure changing unit which changes the hierarchical structure of the function setting menu so to have the item, which is selected by the function selection unit and displayed on the display, positioned at the top of the hierarchical structure.

5 Claims, 8 Drawing Sheets

(a) PRINTING CAN BE MADE (b) OPERATION MENU (c) RESOLUTION SETTING (d) 1200dpi

| MENU TITLE OF FIRST HIERARCHY | STRUCTURE ID | MENU ID | MENU TITLE OF SECOND HIERARCHY | STRUCTURE ID | MENU ID | MENU TITLE OF THIRD HIERARCHY | STRUCTURE ID | MENU ID |
|---|---|---|---|---|---|---|---|---|
| I/F SETTING MENU | NULL | 001 | PARALLEL I/F | 01 | 001 | NIBBLE | 02 | 001 |
| OPERATION MENU | NULL | 002 | ETHERNET I/F | 01 | 002 | ECP | 02 | 002 |
| MENU HIERARCHY CHANGE | NULL | 003 | POWER-SAVING FUNCTION | 01 | 003 | IP ADDRESS | 02 | 003 |
| — | — | — | POWER-SAVING TIME | 01 | 004 | SUBNET MASK | 02 | 004 |
| — | — | — | RESOLUTION SETTING | 01 | 005 | GATEWAY ADDRESS | 02 | 005 |
| — | — | — | — | — | — | VALID | 02 | 006 |
| — | — | — | — | — | — | INVALID | 02 | 007 |
| — | — | — | — | — | — | 5 MINUTES | 02 | 008 |
| — | — | — | — | — | — | 10 MINUTES | 02 | 009 |
| — | — | — | — | — | — | 30 MINUTES | 02 | 010 |
| — | — | — | — | — | — | 600dpi | 02 | 011 |
| — | — | — | — | — | — | 1200dpi | 02 | 012 |
| — | — | — | — | — | — | VALID | 02 | 013 |
| — | — | — | — | — | — | INVALID | 02 | 014 |

FIG.8

ELECTRONIC DEVICE AND METHOD FOR CONTROLLING ITS MENU DISPLAY

BACKGROUND OF THE INVENTION

1. Field of the Invention

The present invention relates to an electronic device which controls a display of a menu formed of a hierarchical structure and a method for controlling the menu display, and more particularly to an electronic device which can display the items of a menu by a simple operation depending on usability by a user who actually uses and a method for controlling its menu display.

2. Description of Related Art

In recent years, devices tend to become compact while functions to be mounted on the devices become multiple as a technology progresses quickly, and a size of a screen showing an item to be set for each function is limited to a small area.

Under the circumstances, the items to be set are configured in a tree style as a hierarchical structure to show a menu, thereby enabling to set the items easily. Similar setting items are grouped by configuring the setting items as the hierarchical structure, and it is possible to reach a desired setting item by following the grouped tree.

For example, to change a paper size in an image forming device, a menu key for showing a menu is pushed on an initial screen, a print setting item is selected on the displayed menu, a paper setting is selected, then it becomes possible to reach an item capable of changing from the currently designated paper size to a desired paper size.

As another example, to change a ring volume of a cellular phone, a classification for setting the sound is selected from a displayed menu, "INCOMING" is selected as a type of sound which is set next, and a volume control item is selected, thereby enabling to reach an item of the ring volume desired to be changed.

But, if an item to be set is located deep in the hierarchical structure, it takes lots of time to reach that item, and it is sometimes hard to reach there because of confusion on the way or the like. An item which is not set again after it is set once does not constitute a problem but if the items such as the above-described paper size and ring volume which are frequently changed are located deep in the hierarchy, there are problems in view of manipulability and operability.

A conventional technology disclosed in Japanese Patent Application Laid-Open No. 11-240229 dynamically changes the content of the hierarchical structure of the menu shown on a display panel such as LCD (Liquid Crystal Display) depending on the connected state of the ancillary device to optimize the operation menu, thereby enabling to display the menu.

But, the conventional technology described in Japanese Patent Application Laid-Open No. 11-240229 may have a difficulty in reaching an item of which setting is desired to be changed because setting items of the ancillary device are various when plural or all ancillary devices are in a connected state to change the hierarchical structure based on the state of the ancillary device which is detachably connected to the device.

Generally, items of which settings are frequently changed are often limited to several types in the progress of multifunctionalization, and most setting items can be used without an additional change from the time when they were initially set. Besides, the setting items include a setting item of which setting is allowed to be changed but not desired to be changed easily. Such an item is desired to be stored in the state of the initial hierarchical structure.

The present invention has been made in view of the above circumstances and provides an electronic device which can easily display a desired setting item by changing a hierarchical structure of a menu formed to have the hierarchical structure and a method for controlling its menu display.

SUMMARY OF THE INVENTION

An aspect of the present invention provides an electronic device which displays a function setting menu for managing plural items by a hierarchical structure on a display and sets setting contents of various functions based on the function setting menu displayed on the display, comprising: a display control unit which displays each item in the function setting menu having the hierarchical structure on the display based on the hierarchical structure in accordance with an operation by a user; a function selection unit which selects and displays on the display the content of a desired function based on the items of the function setting menu displayed by the display control unit; and a hierarchical structure changing unit which changes the hierarchical structure of the function setting menu so to have the item, which is selected by the function selection unit and displayed on the display, positioned at the top of the hierarchical structure.

A further aspect of the present invention provides an electronic device which displays a function setting menu for managing plural items by a hierarchical structure on a display and sets setting contents of various functions based on the function setting menu displayed on the display, comprising: a display control unit which displays each item in the function setting menu having the hierarchical structure on the display based on the hierarchical structure in accordance with an operation by a user; a setting unit which sets a setting content of a desired function based on the item of the function setting menu displayed by the display control unit; a holding unit which holds the item of the function setting menu displayed on the display when the setting content of the function is set by the setting unit; and a hierarchical structure changing unit which changes the hierarchical structure of the function setting menu so to have the item of the function setting menu being held by the holding unit at the top of the hierarchical structure.

A still further aspect of the present invention provides a method for controlling a menu display of an electronic device which displays a function setting menu for managing plural items by a hierarchical structure on a display and sets setting contents of various functions based on the function setting menu displayed on the display, the method comprising: displaying each item of the function setting menu of the hierarchical structure on the display according to the hierarchical structure by a display control unit in accordance with an operation by a user; setting a setting content of a desired function by a setting unit according to the items of the function setting menu displayed by the display control unit; holding the items of the function setting menu displayed on the display by a holding unit at the time of setting the setting content of the desired function by the setting unit; and changing the hierarchical structure of the function setting menu by a hierarchical structure changing unit so as to move the items of the function setting menu being held by the holding unit to the top of the hierarchical structure.

According to the present invention, it is configured to locate a desired setting item at the top of the hierarchical structure depending on usability for an actually using user in the menus formed to have the hierarchical structure such that the desired setting item can be displayed by a simple operation. Thus, the invention provides an effect of enabling to set the frequently-used items easily.

BRIEF DESCRIPTION OF THE DRAWINGS

Embodiments of the present invention will be described in detail based on the following figures, wherein.

DETAILED DESCRIPTION OF THE INVENTION

An example of the electronic device and the method for controlling its menu display according to the present invention will be described in detail with reference to the accompanying drawings.

The example of the present invention described below shows a printer as an image forming device on the electronic device which shows a menu and an example of changing a menu setting item of the printer, but this electronic device is not limited to the printer and can be applied to devices for setting plural items of a cellular phone, a car navigation system, a PDA (Personal Digital Assistant), a camcorder and the like.

Figure 1:
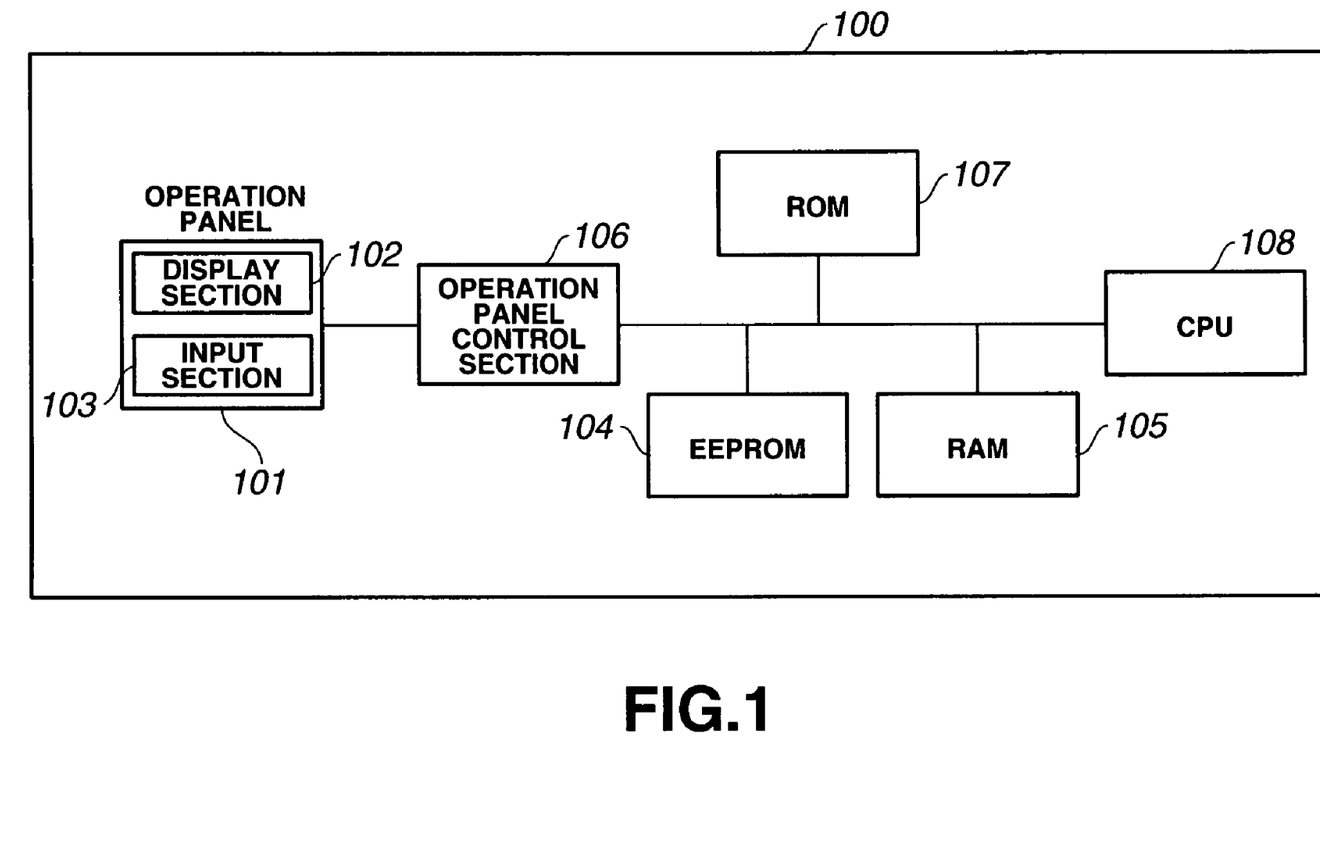
FIG. 1 is a block view configured by applying the electronic device and the method for controlling its menu display according to the present invention.

FIG. 1 is a block view configured by applying the electronic device and the method for controlling its menu display according to the present invention.

In FIG. 1, a printer 100 comprises an operation panel 101, a display section 102, an input section 103, an EEPROM (Electrically Erasable Programmable Read-Only Memory: nonvolatile memory) 104, a RAM (Random Access Memory) 105, an operation panel control section 106, a ROM (Read Only Memory) 107 and a CPU (Central Processing Unit) 108 and executes print processing with reference to function setting information stored in the EEPROM 104.

The operation panel 101 shows a user interface between the printer 100 and an operator and is comprised of the display section 102 and the input section 103.

The display section 102 is a display device such an LCD (Liquid Crystal Display) and visually presents the setting contents of the printer, printing conditions and the like to the operator:

The input section 103 is a group of operation buttons such as input buttons, key switches, a cross key and the like and can be used to set various types of functions possessed by the printer. For example, a size of paper to be printed out can be changed from the currently set "A4" to "B5", and color can be changed.

An item for changing function settings by the input section 103 is searched in the hierarchical structure by operating the cross key and the like so as to find the desired setting item, and information currently set in the setting item is shown on the display section 102. The setting item to change settings is selected by the input buttons and the like, and the information in the selected setting item is changed from the input section 103.

When the setting item is changed next time, the setting item changed last has been moved to the top of the hierarchical structure. For example, it is possible to reach that set item by pushing the right arrow key of the input section 103 plural times or holding down a particular button for about several seconds.

The EEPROM 104 stores setting information about various functions, which is referenced when the printer executes processing, and also stores information (hereinafter referred to as "hierarchic sequence information") indicating the sequence of the menu shown on the display section 102. The hierarchic sequence information is information necessary when the hierarchical structure of the menu to be shown every time the setting item is changed is changed to arrange the setting item which was changed last by the input section 103 at the top of the hierarchical structure.

The RAM 105 stores a combination table in which a combination from the upper hierarchy to the lower hierarchy is set.

The operation panel control section 106 performs setting control to form a hierarchical structure to be shown on the display section 102 of the operation panel 101 based on the hierarchic sequence information stored in the EEPROM 104 and the combination table stored in the RAM 105, to change a hierarchical structure sequence by inputting from the input section 103, and the like.

The ROM 107 stores a control program necessary for printing out by the printer 100, and desired printout can be made by running this control program. The control program executes processing by referring to the setting information necessary for controlling in the EEPROM 104.

Thus, the menu shown on the display section 102 is not held as the hierarchical structure information, but the hierarchical structure is formed and displayed by the operation panel control section 106 based on the hierarchic sequence information stored in the EEPROM 104 and the combination table stored in the RAM 105. Thus, the hierarchical structure can be changed easily, and a desired menu can be formed easily by updating the combination table and the hierarchic sequence information.

Figure 2A:
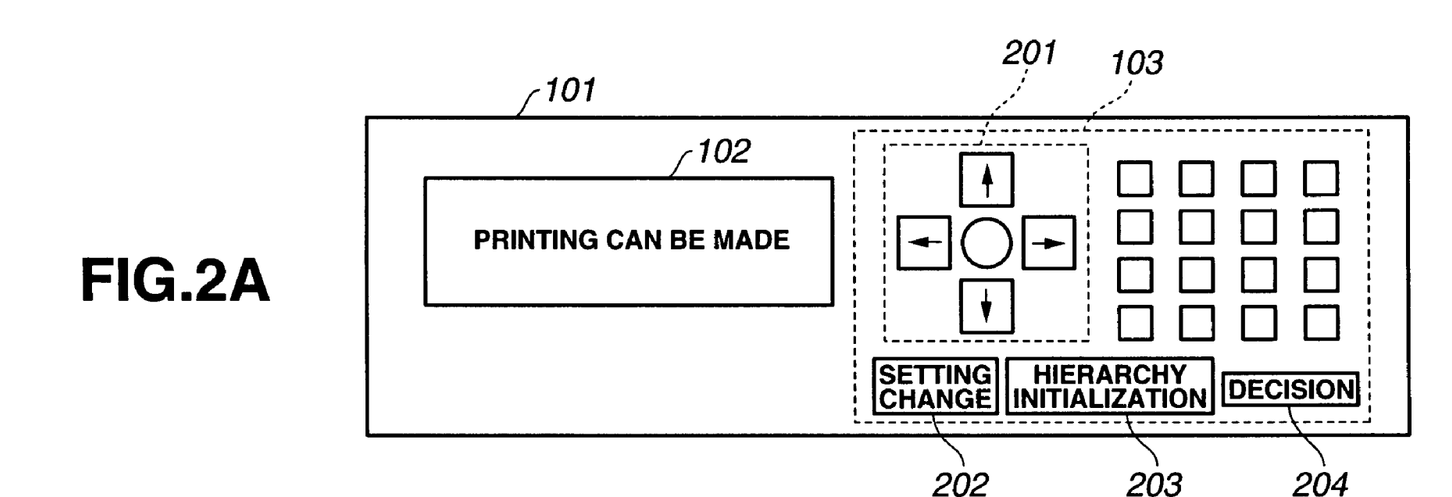
FIG. 2A and FIG. 2B are views showing examples of the operation panel of FIG. 1.
Figure 2B:
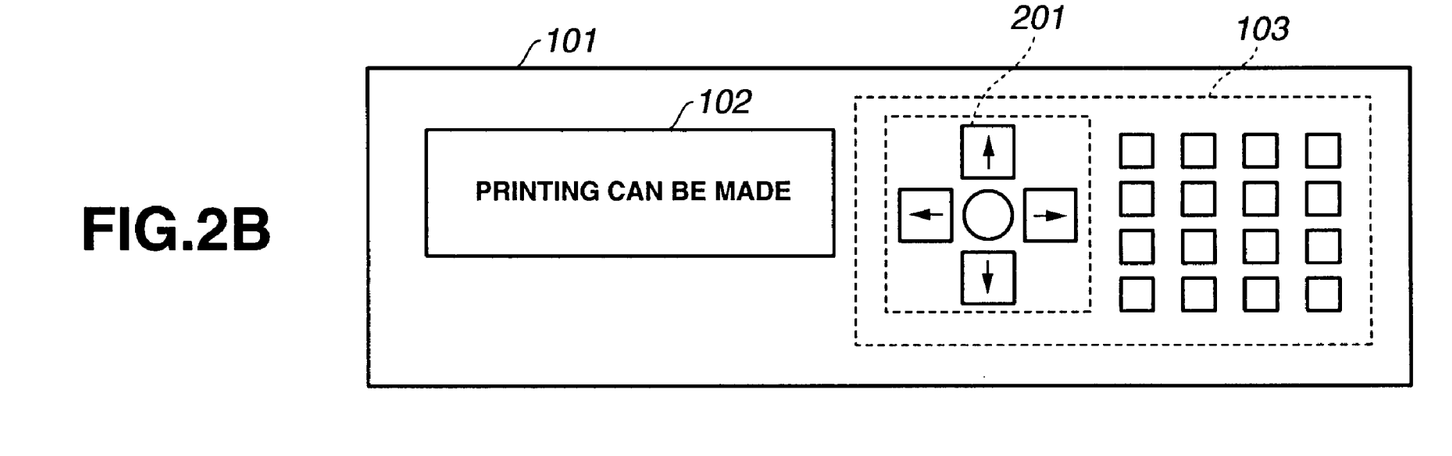

FIG. 2A and FIG. 2B are views showing examples of the operation panel 101 of FIG. 1.

FIG. 2A shows an example of the display section 102 and the input section 103 shown in FIG. 1. The input section 103 indicates an example of the operation panel including a cross key 201, a setting change button 202, a hierarchy initialization button 203 and a decision button 204. FIG. 2B shows an example of the operation panel with the setting change button 202, the hierarchy initialization button 203 and the decision button 204 omitted from FIG. 2A.

The cross key 201 is a group of buttons for retrieving a desired setting item in the hierarchical structure menu by following the hierarchical structure.

The setting change button 202 is a button which is pushed to change a setting item determined for the printer. When this button is pushed, the printer shifts to a setting item changing mode, and it becomes possible to select a desired setting item from the menu having the hierarchical structure by pushing the cross key 201.

The hierarchy initialization button 203 is a button which can return the contents of the hierarchical structure changed several times to the initial state of the hierarchical structure. If a use environment is changed because the printer is used by a different user or its installed place is changed within a corporation or the like, the setting condition in that the printer was used can be reset to the initial state.

The decision button 204 is a button which is pushed when a setting item is selected to change a setting value and the changed content is registered in the printer. Thus, the changed setting value is reflected and, at the same time, the setting item undergone the setting change last is arranged at the top of the hierarchical structure.

Specifically, the decision button 204 is triggered to change the hierarchic sequence information stored in the EEPROM 104 shown in FIG. 1 by the operation panel control section 106.

The processings executed by pushing the setting change button 202, the hierarchy initialization button 203 and the decision button 204 may be configured to be executed by pushing a conventional button or the cross key 201 plural times or holding down for about several seconds without arranging the above buttons on the operation panel. Thus, the operation panel of which space is limited can be used more widely and effectively.

Then, an operation example of the operation panel shown in FIG. 2A will be described.

For example, when the hierarchical structure has a third level of hierarchy as the deepest hierarchy and the setting item of the deepest hierarchy is to be changed, the setting change button 202 is pushed first, then the right button of the cross key 201 is pushed one time, and a setting item "I/F SETTING MENU" which is the first in the hierarchic sequence among the setting items located at the top hierarchy of the menu hierarchical structure is shown from the content "PRINTING CAN BE MADE" being shown on the display section 102.

Besides, when the right button is pushed, a setting item "PARALLEL I/F" which is the first in the hierarchic sequence among the setting items of the second hierarchy which can be set in the setting item "I/F SETTING MENU" is shown. When the down button of the cross key is pushed in the state that "I/F SETTING MENU" is shown, a setting item "OPERATION MENU" which is the second in the hierarchic sequence in the setting item located at the top hierarchy of the menu hierarchical structure is displayed.

In other words, when the right button of the cross key 201 is pushed with the menu of each hierarchy displayed, the setting item shifts to a hierarchy deeper by one level than that of the menu being displayed now. Meanwhile, when the down button of the cross key 201 is pushed, menus which can be selected in the hierarchy being shown are sequentially displayed in order of the hierarchic sequence. When the left button of the cross key 201 is pushed, the setting item shifts to a hierarchy higher by one level than the menu hierarchy being shown, and when the up button is pushed, menus which can be selected in the hierarchy being displayed are sequentially displayed in reverse order of the hierarchic sequence.

When a desired setting item is retrieved and changed, its setting content can be reflected by pushing the decision button 204.

Besides, an operation example of the operation panel of FIG. 2B will be described.

For example, when the hierarchical structure has a third level of hierarchy as the deepest hierarchy and the setting item of the deepest hierarchy is to be changed, the right button of the cross key 201 is pushed with the initial screen "PRINTING CAN BE MADE" displayed, and "I/F SETTING MENU" is displayed. In other words, the setting change can be made by pushing not the setting change button 202 but the right button of the cross key 201 with the initial screen displayed.

And, the cross key 201 is used in the same way as above to change the setting, the right button of the cross key 201 is repeatedly pushed plural times, and the changed setting becomes effective.

Besides, initialization by which all the previously made settings are cancelled to return to the initially set conditions is performed by pushing the plural buttons of the cross key 201 in combination for about several seconds. Otherwise, the initialization is performed by pushing a round button disposed at the center of the cross key 201 for several seconds.

Thus, the processing can be made by detecting a long push or several times of pushing of the cross key 201 without increasing a mechanical button, so that the limited operation panel can be used effectively.

By the above-described two operations, a setting item of the menu having the hierarchical structure can be selected, and the selected setting item can be changed.

Figure 3:
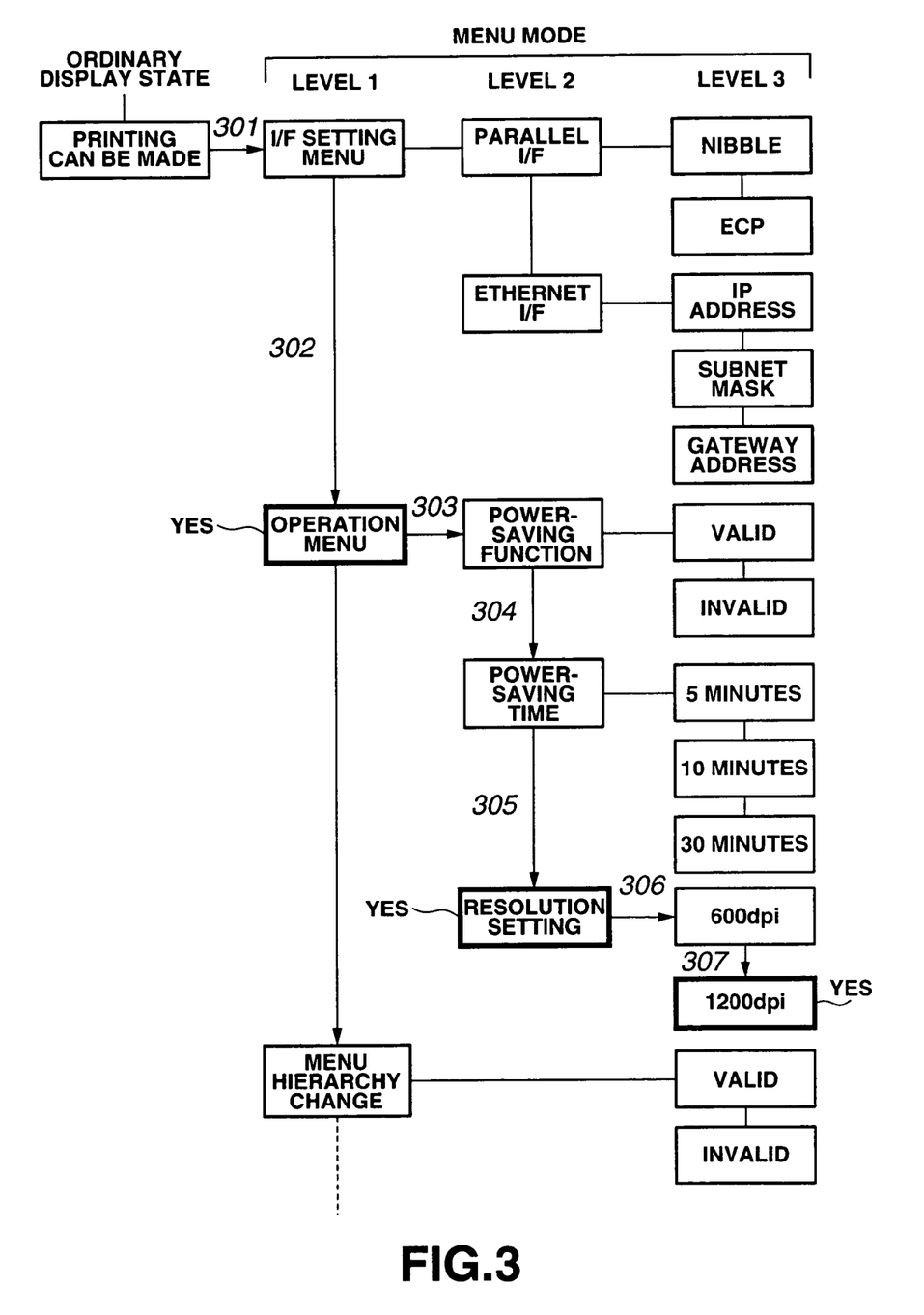
FIG. 3 is a view showing a setting menu and a hierarchical structure before a change.

FIG. 3 is a view showing the setting menu and the hierarchical structure before the change.

FIG. 3 shows a specific example of the menu displayed on the display section 102 of the operation panel 101 shown in FIG. 1 and the hierarchical structure in the state before the change.

The drawing shows a hierarchical structure of menus sequentially displayed by the operation method of the operation panels shown in FIG. 2A and FIG. 2B.

For example, an operation procedure of changing the resolution of a document to be printed out from the current "600 dpi" to "1200 dpi" will be described below. In that case, an item "1200 dpi" in a resolution setting menu may be selected as the setting item.

First, the setting change button 202 is pushed to enable to change the setting item. Then, the right button of the cross key 201 is pushed once to change the display section 102 from the initial state "PRINTING CAN BE MADE" to "I/F SETTING MENU" (301), then the down button is pushed once to switch to "OPERATION MENU" present in the same hierarchy (302). Then, the right button is pushed once to show "POWER-SAVING FUNCTION" (303), the down button is pushed once to show "POWER-SAVING TIME" (304), then the down button is pushed-again to show "RESOLUTION SETTING" menu (305). Thus, it becomes possible to reach the resolution setting item desired to be set, and a setting value for that item is selected.

When the right button is pushed in the state that "RESOLUTION SETTING" is shown, the current resolution setting value "600 dpi" is shown, and when the down button is pushed, resolution "1200 dpi" which can be set is shown. In this state, the decision button 204 is pushed to change the resolution setting value from "600 dpi" to "1200 dpi".

The menu forming the hierarchical structure has an item capable of making a change in the hierarchical structure valid or invalid, and it is also possible to set by the above-described operation so that a change cannot be made.

Figure 4:
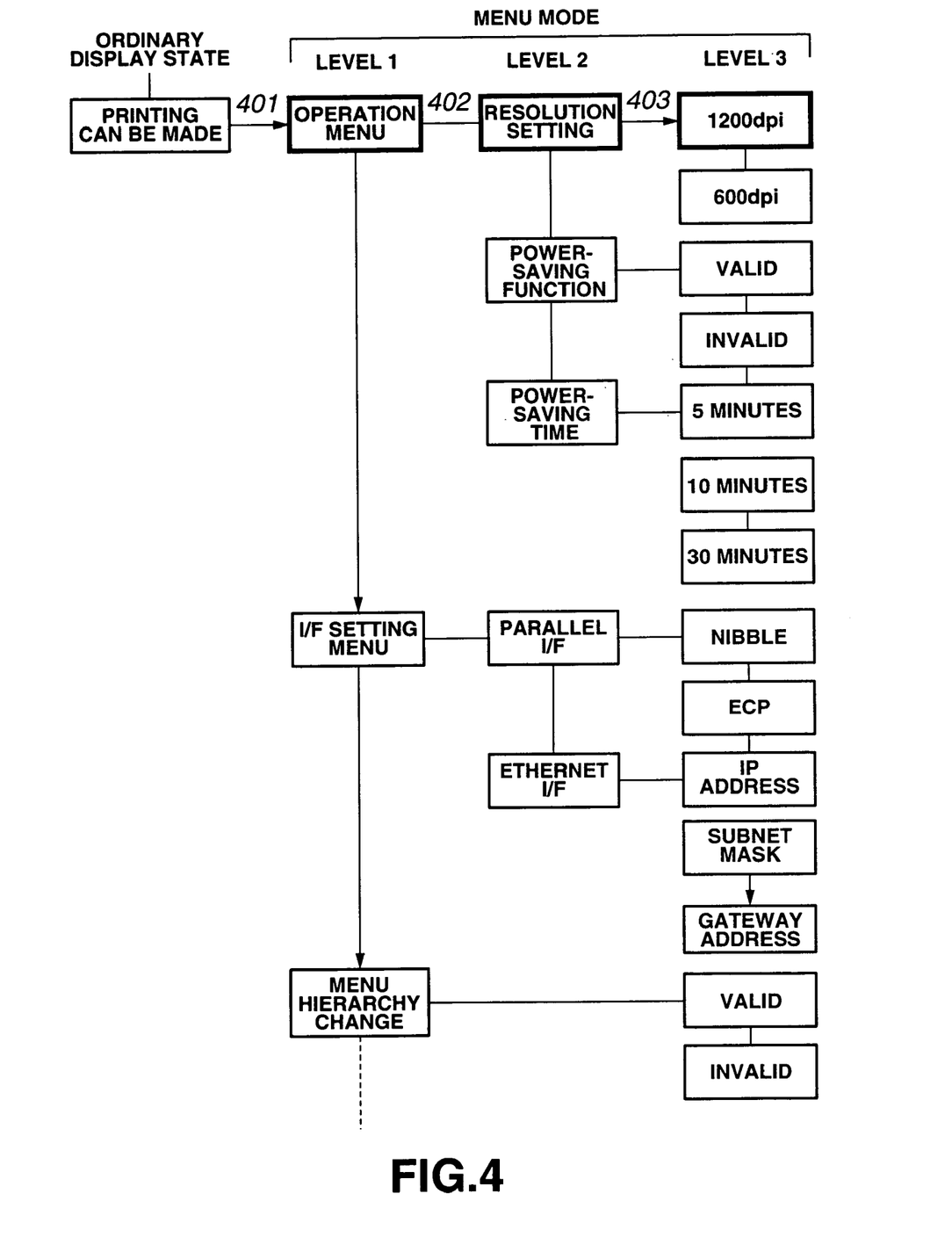
FIG. 4 is a view showing a setting menu and a hierarchical structure after a change.

FIG. 4 is a view showing a setting menu and the hierarchical structure after a change.

FIG. 4 shows the hierarchical structure of a menu just after the change by the operation shown in FIG. 3.

When the setting change button 202 is pushed on the operation panel, it becomes possible to change the setting item, and the right button of the cross key 201 is pushed to show "OPERATION MENU". Thus, the content to be shown is changed from the "I/F SETTING MENU" which was the first shown before the execution of the setting change in FIG. 3.

First, when the right button of the cross key 201 is pushed once from the state that the "PRINTING CAN BE MADE" of the initial state is shown, "OPERATION MENU" is displayed, then the right button is pushed once to display "RESOLUTION SETTING". Then, when the right button is pushed once, "1200 dpi" can be selected.

As described above, the setting item which was changed last is arranged at the top of all hierarchies of the hierarchical structure in a state that the setting items are mutually combined, so that the setting can be changed easily by pushing only the right button of the cross key 201.

In FIG. 3, to change the resolution to "1200 dpi", the cross key must be operated seven times in total in order of "PRINTING CAN BE MADE"→"I/F SETTING MENU"→"POWER-SAVING FUNCTION"→"POWER-SAVING TIME"→"RESOLUTION SETTING"→"600 dpi"→"1200 dpi", but the example of changing the hierarchical structure shown in FIG. 4 can make setting by operating the cross key a total of four times in order of "PRINTING CAN BE MADE"→"POWER-SAVING FUNCTION"→"RESOLUTION SETTING"→"1200 dpi".

Besides, to operate the cross key 201, it is necessary that the right button is pushed three times and the down button is pushed four times as appropriate in the hierarchical structure shown in FIG. 3. But, the right button is continuously pushed three times in the hierarchical structure shown in FIG. 4 to make it possible to set, and operability is improved.

Figure 5:
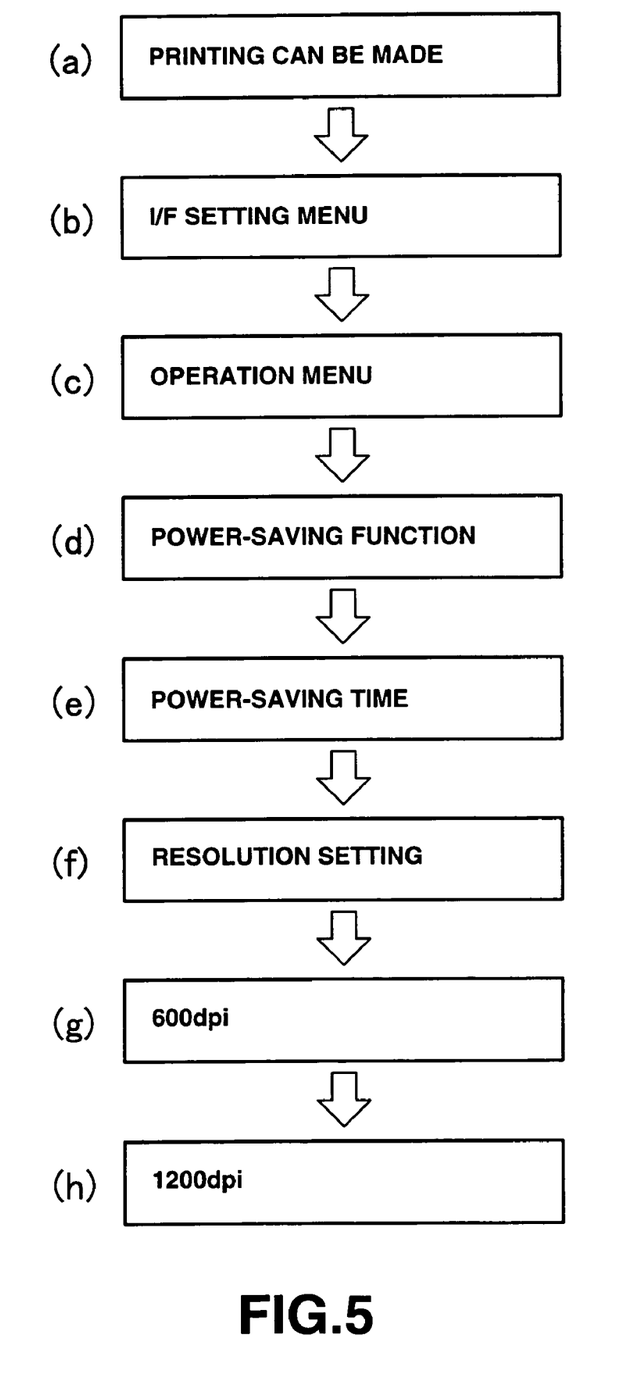
FIG. 5 is a view showing screen transition when resolution settings are changed by following the hierarchical structure shown in FIG. 3.

FIG. 5 is a view showing screen transition when the resolution setting is changed in the hierarchical structure shown in FIG. 3.

In FIG. 5, part (a) indicates a state that the displayed content "PRINTING CAN BE MADE" in the initial state is displayed, and part (b) indicates a state that the displayed content "I/F SETTING MENU" is displayed when the right button of the cross key 201 is pushed once. In FIG. 5, parts (c), (d), (e), (f), (g) and (h) also indicate the contents sequentially displayed on the display section by performing the operation shown in FIG. 3.

A desired menu setting can be made through seven times of screen transitions from the initial display state.

Figure 6:
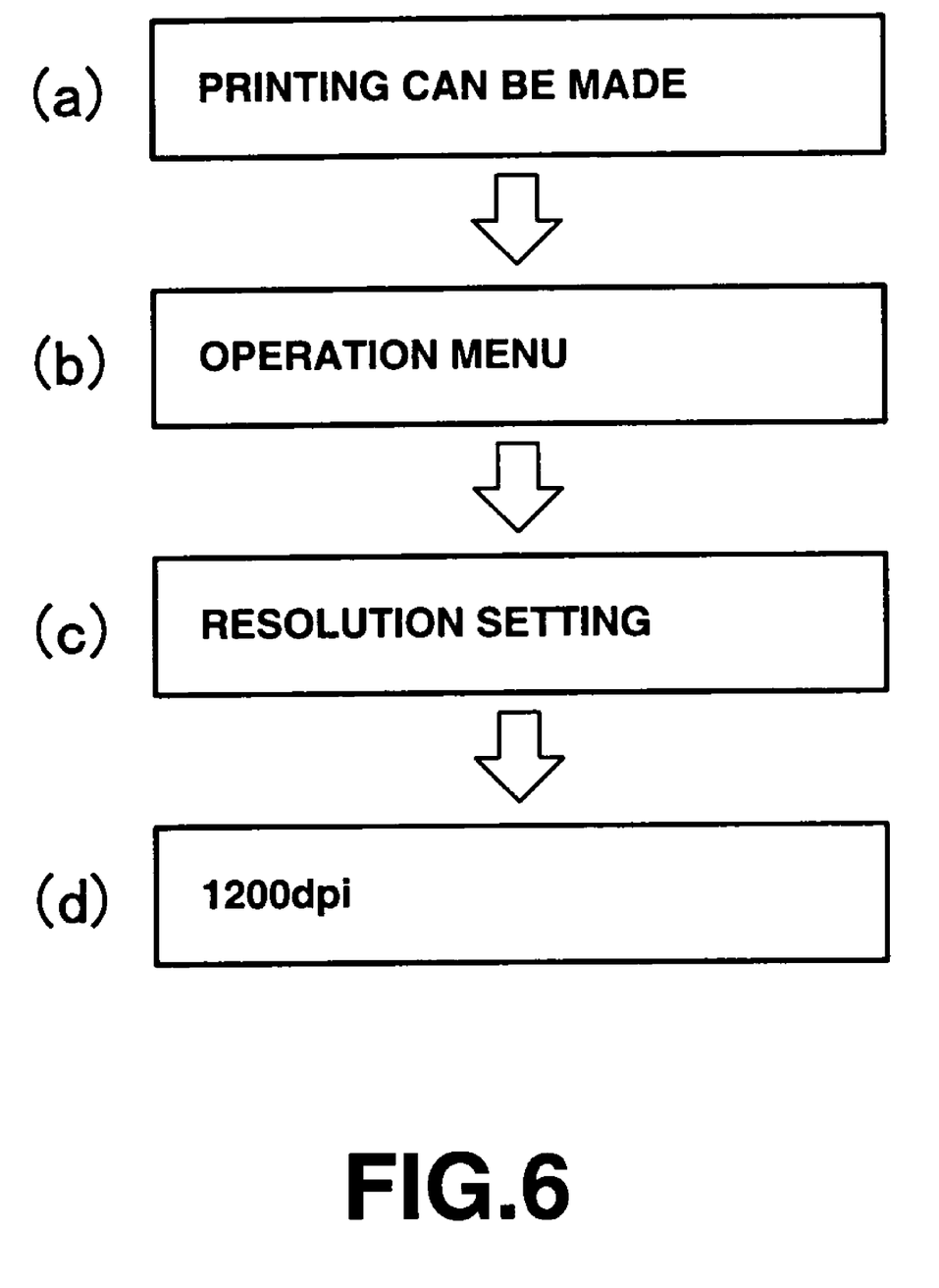
FIG. 6 is a view showing screen transition when a resolution setting item was changed by following the hierarchical structure shown in FIG. 4.

FIG. 6 is a view showing screen transition when the resolution setting item was changed in the hierarchical structure shown in FIG. 4.

In FIG. 6, part (a) indicates a state that the displayed content "PRINTING CAN BE MADE" in the initial state is displayed, and part (b) indicates a state that the displayed content "OPERATION MENU" is displayed when the right button of the cross key 201 is pushed once. In FIG. 6, parts (c) and (d) also indicate the contents sequentially shown on the display section by performing the operation shown in FIG. 4.

Figure 7:
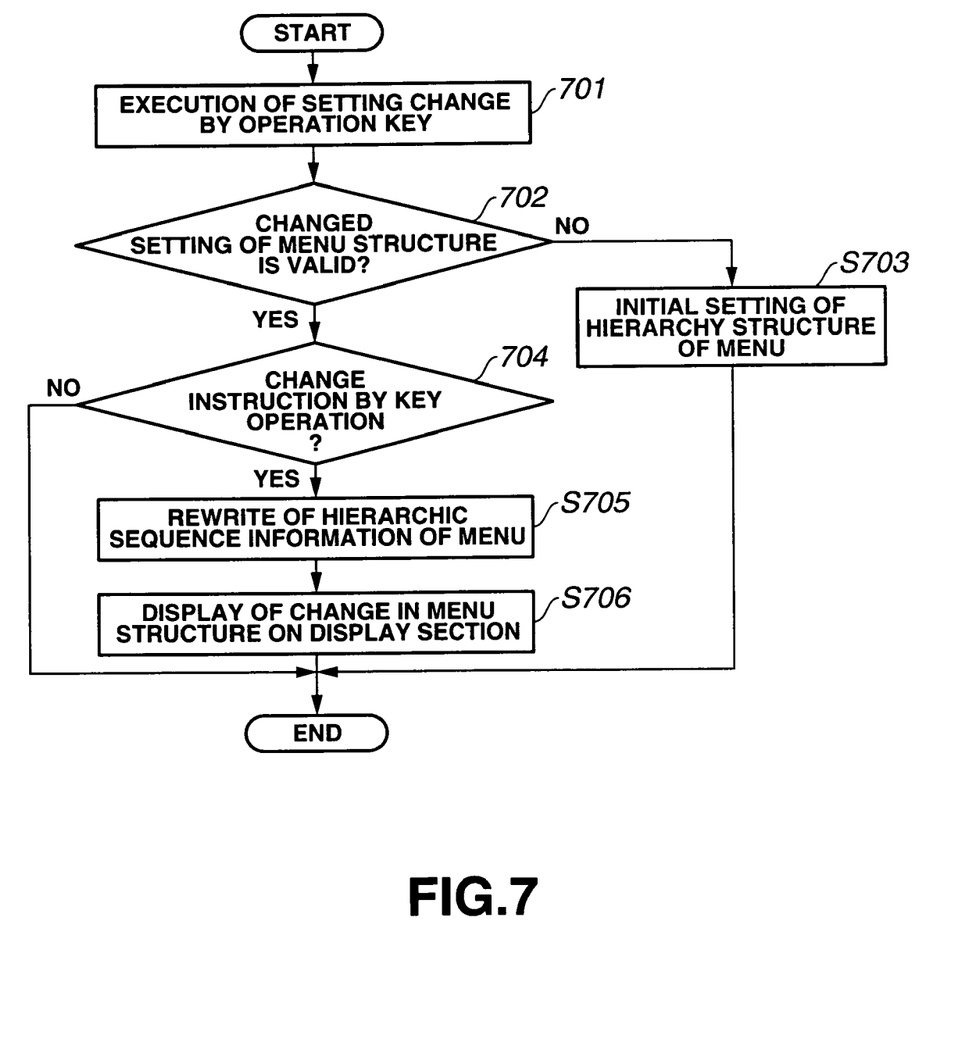
FIG. 7 is a flow chart showing a flow of processing to change a hierarchical structure.

FIG. 7 is a flow chart showing a flow of processing to change the hierarchical structure.

In FIG. 7, the hierarchical structure set by the operations shown in FIG. 2, FIG. 3 and FIG. 4 is changed by the operation panel (S701), and it is judged whether a setting change of the hierarchical structure of the menu is set valid (S702). If the change is not set valid (set to invalid) (NO in S702), the setting of the menu structure is not changed, but the processing is terminated in a state that the initial setting condition is maintained.

Meanwhile, if the setting is valid (YES in S702), it is judged whether a change instruction is given by a key operation (S704). If there is no change instruction by a key operation (NO in S704), the processing is terminated. The change instruction by a key operation indicates an operation of changing the hierarchical structure involved in the change of a setting item by pushing the decision button 204 shown in FIG. 2 for several seconds.

If there is a change instruction by a key operation (S704), the hierarchic sequence information stored in the EEPROM 104 of FIG. 1 is rewritten based on the changed setting item (S705). During the rewriting operation, a message "MENU STRUCTURE BEING CHANGED" is displayed on the display section 102 of the operation panel (S706).

Figure 8:
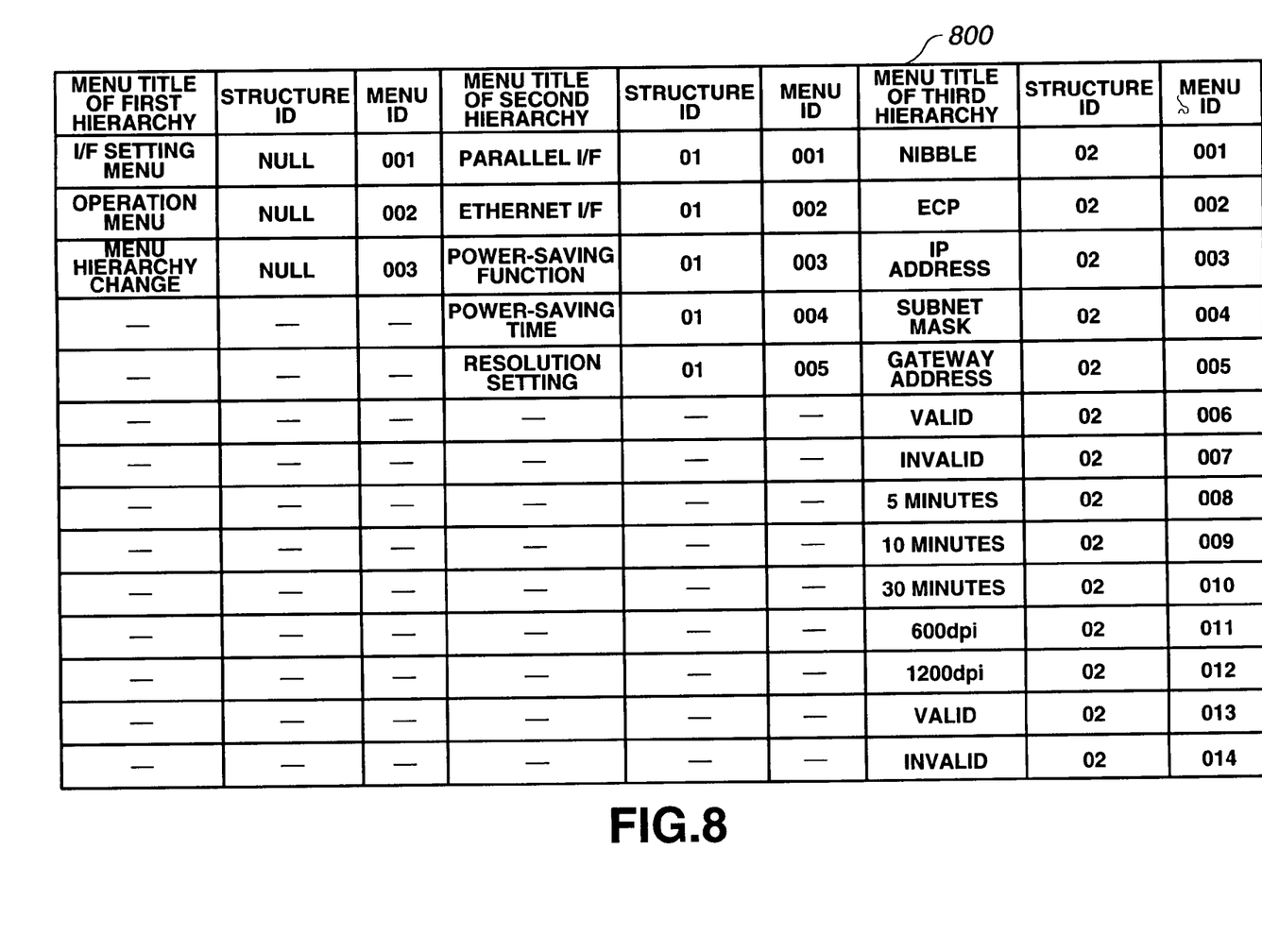
FIG. 8 is a view showing an example of a combination table stored in the RAM shown in FIG. 1.

FIG. 8 is a view showing an example of the combination table stored in the RAM 105 shown in FIG. 1.

The combination in a combination table 800 of FIG. 8 configures the hierarchical structure by allotting:
(1) a pointer from a lower hierarchy to an upper hierarchy (hereinafter referred to as "structure ID"), and
(2) an identifier for identifying the menu (hereinafter referred to as "menu ID").

The menu ID immediately above the hierarchy to be added is designated as the structure ID, and an identifier for uniquely identifying a menu in the same hierarchy is designated as the menu ID. Therefore, a combination of its belonging hierarchy and the hierarchical structure can be defined.

Thus, addition or change of the menu and a change in combination of the hierarchical structure can be made easily, and it is not necessary to manage the menu of the lower hierarchy added from the upper hierarchy every time a menu is added. Thus, expandability and maintainability are outstanding.

For example, "I/F SETTING MENU" in the menu defined in the first hierarchy of the combination table 800 is defined "NULL" as the structure ID, and when "001" is defined as the menu ID, it is found that "I/F SETTING MENU" forms the top of the hierarchical structure because the "NULL" is defined for the structure ID immediately above. The top indicates the first hierarchy which is shown first from the initial state "PRINTING CAN BE MADE" on the display section 102 shown in FIG. 1.

And, the menus can be uniquely identified in the same hierarchy by the menu IDs and displayed in increasing order of the values of the menu IDs on the display section 102 of FIG. 1.

Another example will be described. When "I/F SETTING MENU" shown in the first hierarchy is defined to have "STRUCTURE ID: NULL" and "MENU ID: 0001" and "PARALLEL I/F" shown in the second hierarchy is defined to have "STRUCTURE ID: 01" and "MENU ID: 001", it is seen that the "I/F SETTING MENU" is the top and first hierarchy because the structure ID is "NULL", and the "PARALLEL I/F" is the second hierarchy because the structure ID is "01". Thus, even if the menu ID is same, they can be uniquely identified. In other words, the structure ID and the menu ID are mutually related so that they can be identified as only one within the combination table.

The setting item changed last by the processing as described above can be shifted to the top of the menu having the hierarchical structure.

Thus, to make a next change, the setting item changed last can be displayed by a simple operation, and the setting item can be changed.

The processing shown in the flow chart described above can also be realized by a menu display control program which can be executed by a computer.

The present invention is not limited to the example described above and shown in the drawings, and various modifications may be made without deviating from the spirit and scope of the invention.

In the above-described example, the structure in that the hierarchical structure of the function setting menu is changed at the time of setting the setting contents of functions was described. For example, the hierarchical structure can be changed irrelevant to the setting of the setting contents of the functions by pushing the hierarchy initialization button 203 shown in FIG. 2A.

The present invention can be applied to the electronic device for displaying the setting items of the menu having the hierarchical structure and the method for controlling its menu display, and it is especially useful for displaying the menu of the electronic device which is being miniaturized with the progress of multifunctionalization.

The entire disclosure of Japanese Patent Application No. 2004-273457 filed on Sep. 21, 2004 including specification, claims, drawings and abstract is incorporated herein by reference in its entirety.

What is claimed is:

1. An electronic device which sets setting contents of various functions based on a function setting menu for managing plural items by a hierarchical structure, comprising:
    a hierarchical structure managing unit which stores and manages the function setting menu having the hierarchical structure of the plural items;
    a display controller which displays each item in the function setting menu having the hierarchical structure managed by the hierarchical structure managing unit on a display based on the hierarchical structure, a single item at a time, in accordance with an operation by a user;
    a function selection unit which displays on the display through an operation by a user a desired item of items belonging to a same level in the function setting menu displayed by the display control unit;
    a setting unit which selects and sets a setting content of a desired function corresponding to the item in the function setting menu displayed on the display by the function selection unit through an operation by the user;
    a hierarchical structure changing unit which changes the hierarchical structure of the function setting menu managed by the hierarchical structure managing unit so as to have the desired item in the function setting menu displayed on the display, positioned at the top in the same level of the hierarchical structure immediately following the setting content of the desired function being set by the setting unit; and
    a notification displaying controller which displays that the hierarchical structure of the function setting menu is being changed prior to displaying the hierarchical structure that has been changed by the hierarchical structure changing unit, wherein the hierarchical structure changing unit changes the hierarchical structure of the function setting menu so as to have the desired item positioned at the top in the same level of the hierarchical structure when the number of operations by the user that is required to access and display on the display the desired item of the desired function by the setting unit exceeds a predetermined number of operations, or when the total time that it takes the user to access and display on the display the desired item of the desired function by the setting unit exceeds a predetermined amount of time.

2. The electronic device according to claim 1, wherein the hierarchical structure changing unit changes the hierarchical structure of the function setting menu so as to have the desired item positioned at the top in the same level of the hierarchical structure if it is set by the function setting menu to allow a change of the hierarchical structure.

3. A method for controlling a menu display of an electronic device which displays a function setting menu for managing plural items by a hierarchical structure on a display and sets setting contents of various functions based on the function setting menu displayed on the display, the method comprising:
    storing and managing the function setting menu having the hierarchical structure of the plural items;
    displaying each item of the managed function setting menu of the hierarchical structure, a single item at a time, on the display according to the hierarchical structure in accordance with an operation by a user;
    displaying on the display through an operation by a user a desired item of items belonging to a same level in the displayed function setting menu;
    selecting and setting a setting content of a desired function corresponding to the item in the function setting menu displayed on the display through an operation by a user;
    changing the hierarchical structure of the function setting menu so as to have the items of the displayed function setting menu, positioned at the top in the same level of the hierarchical structure immediately following the setting contents of the desired function being set; and
    displaying that the hierarchical structure of the function setting menu is being changed prior to displaying the hierarchical structure that has been changed by said changing the hierarchical structure, wherein the hierarchical structure of the function setting menu is changed so as to have the desired item positioned at the top in the same level of the hierarchical structure when the number of operations by the user that is required to access and display on the display the desired item of the desired function by the setting unit exceeds a predetermined number of operations, or when the total time that it takes the user to access and display on the display the desired item of the desired function by the setting unit exceeds a predetermined amount of time.

4. The electronic device of claim 1, wherein the hierarchical structure is configured by allotting a pointer from a lower hierarchy to an upper hierarchy, and allotting an identifier for identifying the menu.

5. The method of claim 4, comprising configuring the hierarchical structure by allotting a pointer from a lower hierarchy to an upper hierarchy, and allotting an identifier for identifying the menu.

* * * * *